(12) United States Patent
Moore

(10) Patent No.: US 10,109,062 B1
(45) Date of Patent: Oct. 23, 2018

(54) NON-COHERENT POINT TRACKING AND SOLVING FOR AMBIGUOUS IMAGES AND GEOMETRY

(71) Applicant: Lucasfilm Entertainment Company Ltd., San Francisco, CA (US)

(72) Inventor: Douglas Moore, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 75 days.

(21) Appl. No.: 15/283,070

(22) Filed: Sep. 30, 2016

(51) Int. Cl.
*H04N 13/221* (2018.01)
*G06T 7/20* (2017.01)
*G06T 7/00* (2017.01)
*G06T 7/33* (2017.01)
*G06T 7/246* (2017.01)

(52) U.S. Cl.
CPC .......... *G06T 7/2033* (2013.01); *G06T 7/0042* (2013.01); *G06T 7/0085* (2013.01); *G06T 7/246* (2017.01); *G06T 7/33* (2017.01); *H04N 13/221* (2018.05); *G06T 2207/10021* (2013.01); *G06T 2207/30204* (2013.01); *G06T 2207/30244* (2013.01)

(58) Field of Classification Search
CPC ... G06T 7/2033; G06T 7/0042; G06T 7/0085; G06T 2207/30204; G06T 2207/30244; G06T 2207/10021; G06T 7/246; G06T 7/33; G06K 9/4604; H04N 13/221
See application file for complete search history.

(56) References Cited

U.S. PATENT DOCUMENTS

2013/0148851 A1* 6/2013 Leung .................. G06K 9/3241
382/103
2016/0093058 A1* 3/2016 Moteki ..................... G06T 7/73
382/154

OTHER PUBLICATIONS

Vavilin, "Camera Motion Estimation and Moving Object Detection", Advanced Research in Applied Artificial Intelligence, vol. 7345, 2012, pp. 544-552.

* cited by examiner

*Primary Examiner* — Siamak Harandi
(74) *Attorney, Agent, or Firm* — Kilpatrick Townsend & Stockton LLP

(57) ABSTRACT

System and methods are provided for a non-coherent point tracking process that allows unknown camera motion to be estimated. One or more edges can be identified in images captured by a camera when shooting a scene. For each of the identified edge in the images, at least one tracking object can be placed arbitrarily on the edge. The positions of tracking objects in the images can then be used to estimate a camera motion. In some embodiments, two tracking objects can be placed arbitrarily on the edge to represent the edge and move along the edge arbitrarily from image to image where the edge appears. Multiple of such edges can be identified in the images and camera motions in multiple directions can be estimated based on the identified edges and combined to obtain a combined camera motion indicating the camera's movement in a 3D space when shooting the scene.

20 Claims, 10 Drawing Sheets

NON-COHERENT POINT TRACKING AND SOLVING FOR AMBIGUOUS IMAGES AND GEOMETRY

BACKGROUND OF THE INVENTION

This disclosure relates to recovering 3D structure and/or unknown camera motions.

In computer vision, structure from motion refers to a process of estimating camera motion and 3D structure by exploring the motion in a 2D image plane caused by the moving camera. The theory that underpins such a process is that a feature in the 2D image plane seen at a particular point by the camera actually lies along a particular ray beginning at the camera and extending out to infinity. When the same feature is seen in two different images, the camera motion with respect to that feature can be resolved. Using this process, any point seen in at least two images may also be located in 3D using triangulation.

However, conventional feature-based camera motion estimation algorithms typically require at least one identifiable feature to exist in two images so that the feature can be tracked in the images. This is limited in that geometry information of a fixed feature needs to be known for those algorithms to work well. Some of those conventional algorithms also require the camera's information be known, such as aspect ratio or field of view.

For example, Blender® is a tool that can be used to estimate camera motion and reconstruct a scene in 3D virtual space. Specifically, Blender® can let the user or automatically specify one or more tracking points for certain identifiable features in a series of images extracted from a video footage by marking those points in the video footage. The positions of these features are then tracked throughout the images. A user can obtain camera motion for those images by providing the tracked positions of these features in the images to a solver provided by Blender®. Through the solver, Blender® can then compute the camera motion using the positions of these features in the images. The underlying theory of the solver is that appearance of any of these features in two adjacent image frame(s) can indicate a motion of the camera.

However, to capture a scene, a director may shoot extreme close-ups with very little image surrounding a subject. For example, an extreme close-up of a portion of a room can leave very little objects or features in the close-up to be tracked. Thus, calculating the camera motion using the conventional feature-based camera motion estimation algorithms, such as that employed by Blender®, can be difficult for an extreme close-up scene. In the aforementioned example, all that is left in the background may be an edge of a window, a top of a wall, or a corner of the room. In that example, there is not enough geometry information that can be used by the conventional feature-based camera motion estimation algorithms to track a feature to compute a single pattern in the images.

BRIEF SUMMARY OF THE INVENTION

Embodiments can provide systems and methods for a non-coherent point tracking process, which allows unknown camera motion to be estimated with less complete image information as compared to conventional camera motion techniques. In some embodiments, as part of the camera motion estimation process, a determination can be first made as to whether at least one trackable feature exists in a series of images for which camera motion is to be determined. In those embodiments, when it is determined that no or not enough such trackable features exist in the images, one or more edges can be identified in each of the images. For each of the identified edge in the images, at least one tracking object, e.g., a marker, can be placed arbitrarily on the edge to mark the edge. In some embodiments, two tracking objects can be placed arbitrarily on the edge to represent the edge and move along the edge arbitrarily from image to image where the edge appears. The positions of tracking objects in the images can then be used to estimate a camera motion. For example, the positions of the arbitrarily tracking objects for each image can then be provided to a camera motion solving engine to estimate the camera motion.

In some embodiments, the aforementioned camera motion estimation process can be repeated for a number of iterations. In those embodiments, camera motion estimated from each iteration can be combined to obtain a corrected camera motion for the images. In some embodiments, a user may be enabled to control the aforementioned camera motion estimation process by specifying additional edges to be tracked after certain iteration(s). For example, in those embodiments, the user can be enabled to preview a result of a 3D scene reconstructed based on the estimated camera motion after a first iteration and determine that the 3D scene is not accurate as compared to the scene in the images. In those embodiments, the user can then be enabled to specify one or more additional edges in the images to be tracked in another iteration of the aforementioned camera motion estimation process.

In some embodiments, the tracking object that can be arbitrarily placed on an identified edge can include a single point bundle. In those embodiments, the single point bundle can animate along a vector or can be constrained to a 3D spline-type curve. Such a tracking object can allow the camera motion solving engine to calculate a correct 3D camera position, without information indicating a direct correspondence between the 2D and 3D spaces in the images.

Other embodiments are directed to systems, portable consumer devices, and computer readable media associated with methods described herein.

DEFINITIONS

Figure 1:
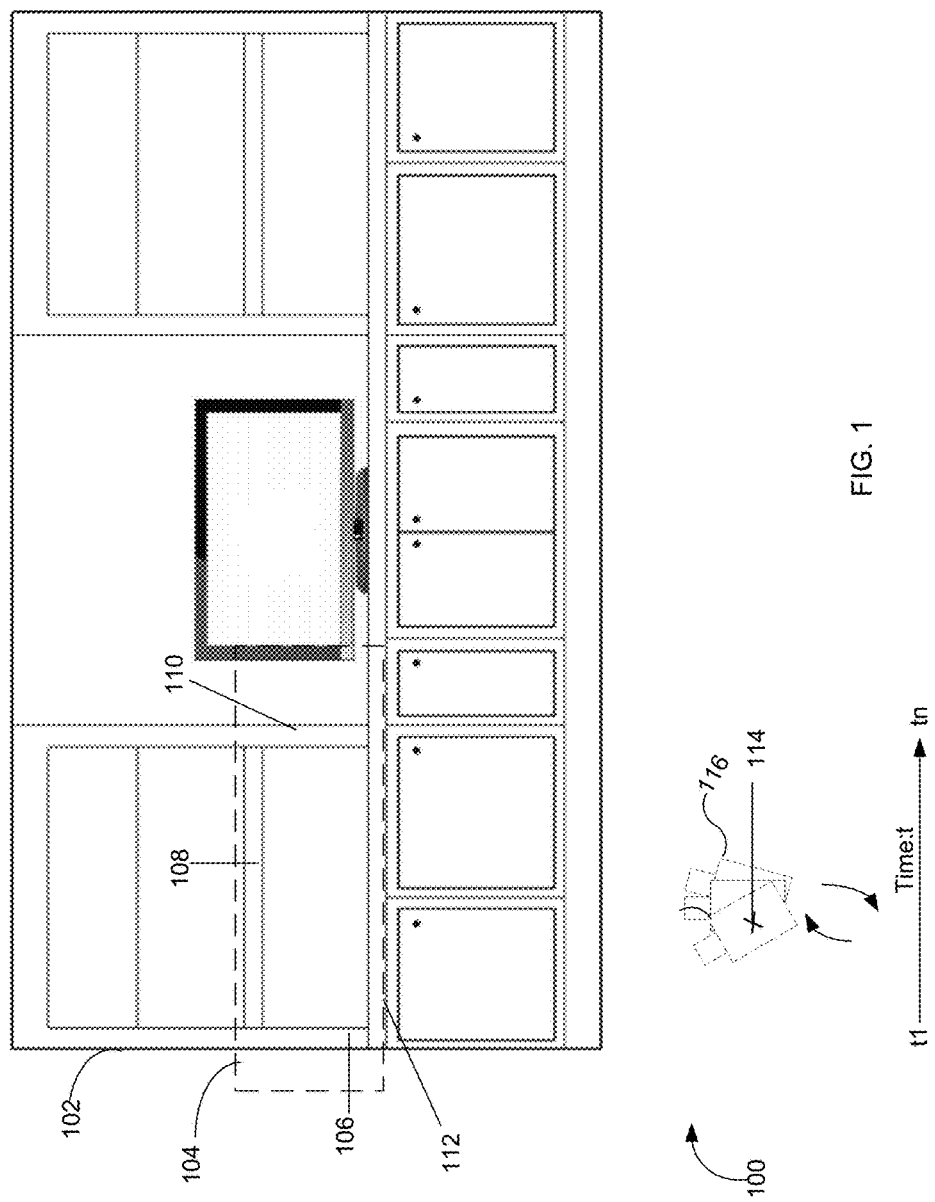
FIG. 1 is a diagram showing a scene is shot in close-up by a camera.

As used herein, a scene may be shot by a camera and mapped to a series of images (frames). The scene can be shot in a real-world or a 3-Dimension (3D) world. The frames can be effectively obtained at successive times, e.g., 24, 36, or 48 frames per minute.

The term "contradictory motion" as used herein can refer to a camera motion that is opposite to an edge identified in one or more images. For example, if a horizontal edge is identified in the images, a "contradictory motion" of the camera with respect to that edge is tilting or moving up and down. As another example, if a vertical edge is identified in the images, a "contradictory motion" of the camera with respect to that edge is panning left and right.

As used herein, panning is a motion that during the shooting, the head of the camera moves to its right/left while the end of camera moves to its left/right, respectively, such that a center of camera remains fixed in position.

As used herein, tilting is a motion when the camera moves upward or downward during the shooting. During tilting, when camera moves up, the head of camera up/down while the end of camera moves to its down/up, respectively, such that a center of camera remain fixed in position.

As used herein, rolling is a motion when the camera rotates about an axis through a center of its body. Zooming is a motion when camera is pulled away from or closing on scene during the shooting.

Camera motion as used herein can refer to a combination of at least one of rotation around three axes (panning, tilting, and rolling) and translation along the three axes (moving from left and right, moving from up and down, and moving backward and forward). For example a camera motion when shooting a scene can include panning from left to right and zooming-in and out of an object in the scene.

DETAILED DESCRIPTION OF THE INVENTION

A camera is generally mounted to a head, which allows the camera operator to pan and tilt the camera. The following are some examples of basic types of camera moves.

Lock-off: A shot with a fixed camera position (i.e. NO camera translation or rotation). However, there could still be variation (weave) in the frame-to-frame registration of the image that will need to be accounted for.

Pan: Left/right rotation of camera (generally the Y-axis for CG cameras)

Tilt: Up/down rotation of camera (generally the X-axis for CG cameras)

Dolly: Camera is mounted on a wheeled platform (dolly) which is moved by pushing it (either on a flat hard surface, or along a track). Dolly will usually allow for up/down movement of the camera also.

Crane: Incorporates a long counter-weighted arm that allows camera to move with a greater range of height, or reach. Crane may be part of a dolly rig or be mounted to a motorized vehicle. Some cranes support both the camera and it's operator, while others may support only a remotely-controlled camera.

Motion-control: Camera is mounted to a motorized rig (such as a track-mounted dolly with crane arm). Camera's movement is programmed and driven by a computer, allowing for precise and repeatable movement.

Camera Car: Camera is mounted to a car or truck, which may also incorporate lighting equipment.

Helicopter: Camera is mounted in a special stabilizing mount that allows for camera movement, while isolating the camera from vibration generated by the helicopter.

Hand-held: Camera is held and moved by the camera operator.

Steadi-cam: Camera is mounted to a stabilizing rig, being worn by the operator. The rig allows the camera to 'glide' along, isolating it from most of the jarring movement of the operator's body while walking, running, etc.

It is noted that roll (commonly referred to as Z-Roll) is used to describe the side-to-side rotation of the camera. This rotation axis is essentially perpendicular to the film plane, which is the Z-axis for CG cameras at ILM. With the exception of hand-held, steadi-cam, and some remote-head shots, there will typically be very little Z-roll in a camera's motion, but some Z rotation value may be present due to the type of camera support being used, as well as its general orientation to the ground plane.

Embodiments are directed to a system and a method for estimating camera motion including those described above for a scene without complete geometry information. In accordance with the disclosure, one or more images depicting the scene can be received. For each of the images, at least one edge can be identified and at least one tracking object, e.g., a marker, can be randomly placed on the edge(s) to track points that are allowed to move along the edge(s). Camera motion can be estimated based on the positions of the randomly positioned tracking object(s) in the images.

Generally speaking, motion in a sequence of images results from motion of a camera and from displacement of individual objects. The former is typically referred to as global motion and the latter is typically referred to as localized motion in the art. Conventional techniques have been generally developed in the art for estimating both types of motion using motion models and/or motion vectors. The conventional techniques typically require geometry information regarding one or more features or objects in a scene to be known. For example, feature-based techniques have been developed to estimate unknown camera motion by tracking certain features captured in the image frames of the scene. However, for certain scenes, a trackable feature may not necessarily exist. FIG. 1 illustrates such a scene.

In FIG. 1, a media cabinet 102 is captured by camera 116. As shown, at time t1, camera 116 may be moved into a position 114 to shoot a close-up scene 104 of a portion of media cabinet 102. As shown, in scene 104 shot by camera 116, a left side frame 106, a top frame 108, a right side frame 110, and a bottom frame 112 of the media cabinet 102 are captured in close-up. As also shown, from time t1 to tn, camera 116 may engage in a panning motion from left to right.

Figure 2:
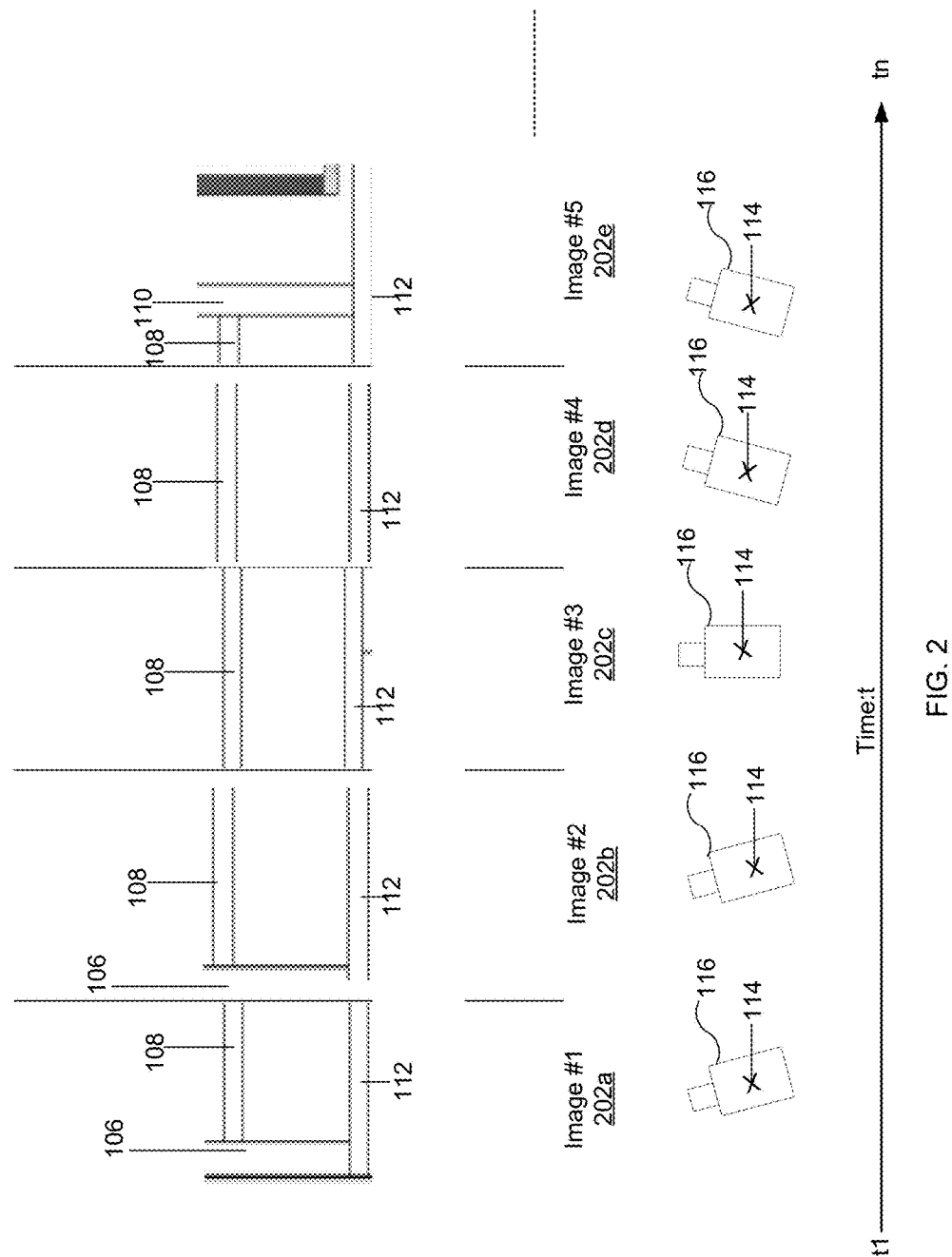
FIG. 2 illustrates a plurality of image frames can be captured by camera during the time when the scene is shot as illustrated by FIG. 1.

FIG. 2 illustrates a plurality of image frames can be captured by camera 116 during the time period from t1 to tn when scene 104 is shot as illustrated by FIG. 1. In this example, five successive image frames, 202a-e, captured by camera 106 in this time period are shown. As shown in this example, in each of the image frames, 202a-e, portions of a left side frame 106, a top frame 108, a right side frame 110, and/or a bottom frame 112 of the media cabinet 102 are captured. It should be understood this is merely illustrative and the number of images captured by a camera may be more or less than five.

To solve camera motion for images 202a-e, a conventional camera motion estimation tool, would require various trackable points to be specified in those images. For example, such a trackable point would be a pixel or pixels with a distinctive feature that is different and in contrast with surrounding pixels, and represents a feature in the images that can be compared to establish correspondence between the images. For example, the conventional camera motion estimation tool may enable a user to place a tracking object on a recognizable image area (i.e., pixel pattern) in an image in a sequence as defined by the conventional camera motion estimation tool. The tool then will step through each frame in the sequence to find and match that pixel pattern, center a tracking object on the matched pixel pattern in one or more of those frames and record positions of the placed markers.

After selecting and tracking a number of such pixel patterns or features in the frames, the conventional camera motion estimation tool can then solve the camera motion based on the positions of the tracking objects by comparing the tracking object change in relationship over the frame range of the scene captured in the frames. Typically, in order for the conventional camera motion estimation tool to work well, the tracking object should encompass as much of the height, width, and DEPTH of the 3D world represented in the scene captured in the frames as possible. However, in images 202a-n shown in FIG. 2, such a fixed trackable point does not exist. That is, the portion of the media cabinet captured in each of the images 202a-e may not have a distinctive feature that can be identified as a trackable point for solving the camera motion as required by the conventional camera motion estimation tool.

One insight the present disclosure provides is that for image frames like 202a-e, while there are no trackable points in the images, one or more edges can be identified in the images. Such an edge, for example the right side frame 106 of the media cabinet 102 can represent a static line in scene 104. A camera motion can then be estimated based on this edge. Since the side frame 106 of the media cabinet 102 does not move when the scene 104 is shot while the camera moves, the camera motion relative to the side frame 106 can be estimated. The camera motion can be best estimated when the camera is moving in a contradictory motion with respect to side frame 106. Therefore, the side frame 106 can be used to estimate the camera motion when the camera is panning or rolling from left to right.

However, unlike a distinctive feature in the image that can be tracked, an edge in the image 202a-e does not necessarily have distinctive features that can be tracked. For example, when the side frame 106 of the media cabinet 102 appears in two successive images—202a and 202b, it is difficult to know how the side frame 106 exactly positions with respect to the camera in those images. That is, the camera may have moved in a combination of directions in space relative to the side frame 106 during the two images and hence the portions of the side frame 106 shown in the images 202a and 202b may not be identical and may very well be very different in those images. For example, if the camera 116 also engages in a tilting motion while panning when shooting scene 104, the portion of left side frame 106 shown in image 202a and image 202b can be different, and how the camera 116 moves when scene 104 is shot is unknown and therefore cannot be presumed. As also mentioned above, since the side frame 106 does not have a distinctive feature that can be identified as a trackable point, a tracking object cannot be placed at a point on the side frame 106 simply because there is no information regarding such a point on the left side frame 106 in images 202a and 202b.

Nevertheless, as mentioned above, an edge in an image that can be used as a reference to estimate a camera motion lies in its being static when the images are shot by the camera. Therefore, the exact portion of the edge shown in a given image may not be necessary for estimating the camera motion in a direction contradictory or substantially contradictory to that edge. Using the left side frame 106 in images 202a and 202b as an example, a rolling or panning camera motion may still be estimated based on the position of the side frame 106 since it is vertical and it is static when images 202a and 202b are shot.

Figure 3:
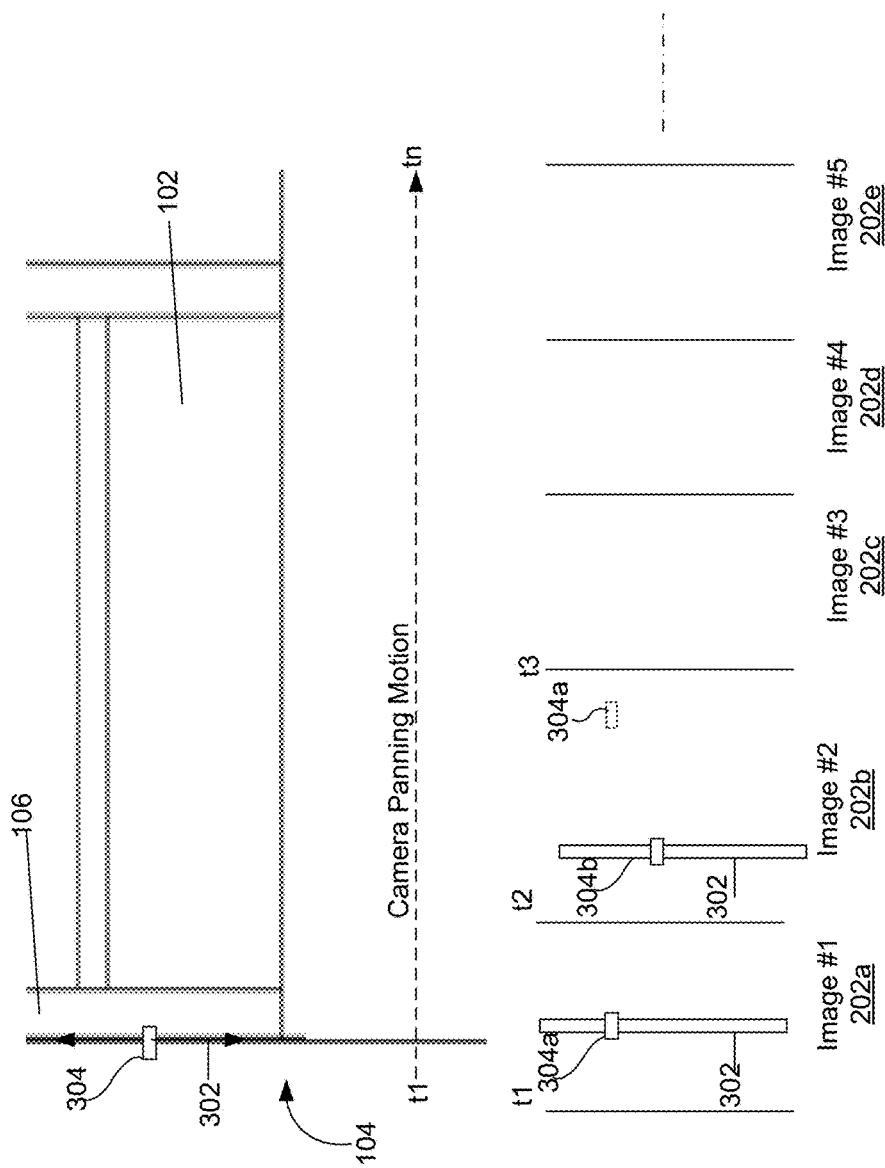
FIG. 3 illustrates an example of placing a tracking object on an edge in images for estimating camera motion in accordance with the disclosure.

FIG. 3 illustrates an example of placing a tracking object on an edge in images for estimating camera motion in accordance with the disclosure. As described above, during shooting of scene 104 as shown in FIG. 1, camera 116 engages in a panning motion from left to right from t1 to tn. A series of images 202a-e may be captured by camera 116 when shooting scene 104 and may be received by a motion analysis tool. As explained above, since scene 104 is a close-up shot of a portion of a media cabinet 102, there may not be a distinctive feature that can be used as a trackable point for estimating a motion of camera 116. However, as also explained above, an edge 302 representing side frame 106 can be identified in image 202a, which is shot at time t1 and in image 202b, which is shot at time t2. In this example, as shown, the edge 302 is an outer side of frame 106. This is not intended to be limiting. It should be understood that in some other examples, the edge that can be marked for solving camera motion in accordance with the disclosure can be an inner side of frame 106 in some other examples, or any identifiable side in the image of any thickness so long as the tracking object is placed on the edge covering the full width of the edge. It should also be understood that in some other examples, the edge that can be marked may not necessarily be straight. For example, a circular edge like a corner of the media cabinet 102 may be used as such an edge in some examples. As another example, a non-linear edge like the top of lampshade may be marked for solving camera motion in accordance with the disclosure in some examples. In any case, as illustrated in this example, a tracking object 304a can then be placed in image 202a at a first arbitrary position on edge 302, and a tracking object 304b can be placed in image 202b at a second arbitrary position on edge 302. Since edge 302 does not appear in images 202c-e, no tracking objects are placed on edge 302 in those images. It should be noted that the images 202a-e illustrated in FIG. 3 are just for showing where the edge 302 is in those images and other details of the contents in those images are not shown for the sake of clarity.

In some embodiments, as shown in the top portion of FIG. 3, instead of placing a tracking object in each image where the edge 302 appears as described above, a tracking object 304 may be placed on edge 302 and be instructed to slide arbitrarily up and down along edge 302 from image to image where edge 302 appears. For example, the images may be received by a camera motion analysis tool and tracking object 304 may be placed on edge 302 by a user manually and the user may instruct the camera motion analysis tool to slide the tracking object 304 arbitrarily on edge 302 in subsequent images where edge 302 appears.

Figure 4:
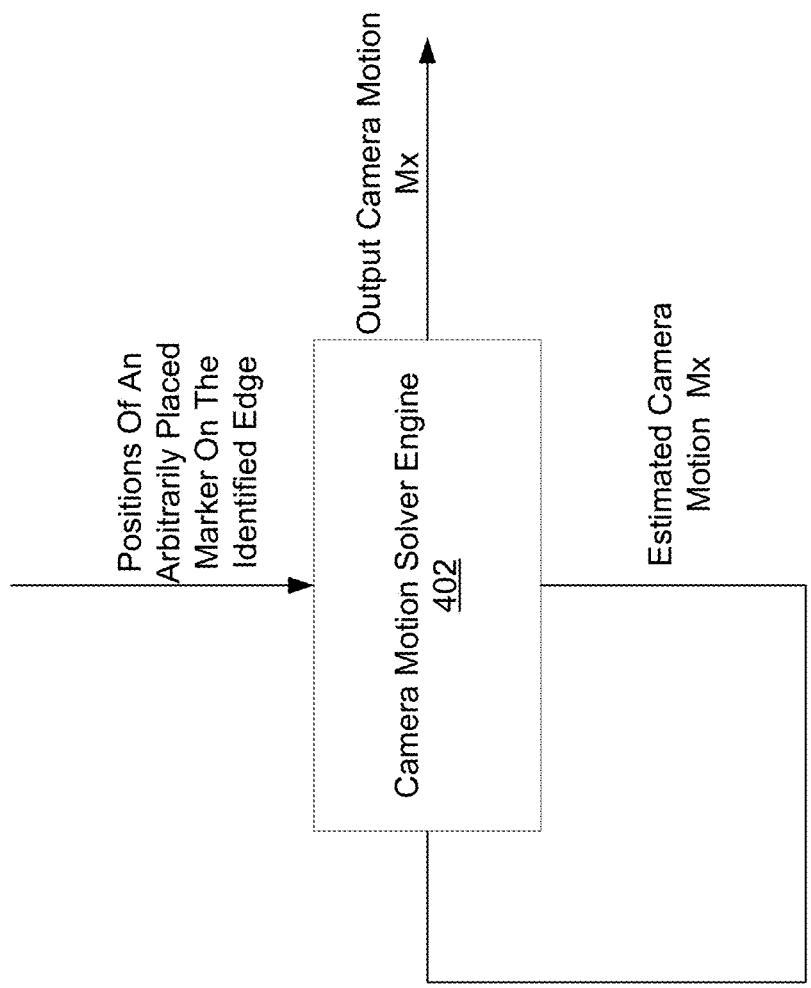
FIG. 4 illustrates a camera motion solver engine that can be implemented to estimate a camera motion based on position of a tracking object that is arbitrarily placed on an edge identified in one or more images for a scene.

In any case, as shown, tracking object 304a and 304b are displaced with respect to each other due to the panning motion of camera 116 when from t1 to t3. The positions of tracking object 304a and 304b can then be sent to a motion estimation engine for solving camera motion. This illustrated in FIG. 4. FIG. 4 illustrates a camera motion solver engine 402 that can be implemented to estimate a camera motion based on position of a tracking object that is arbitrarily placed on an edge identified in one or more images for a scene, such as images 202a-e for scene 104. As shown, positions of the tracking object can be received by the camera motion solver engine 402 and the camera motion can be estimated based on the received positions. In some implementations, the camera motion estimation by the camera motion solver engine 402 may involve determining displacements between the positions of the tracking objects and solve the camera motion based on the determined displacements. As also shown, the camera motion solver engine 402 may be configured to improve the estimated camera motion through multiple iterations of estimation. For example, after a first camera motion is estimated from a first set of positions of the tracking object on the identified edge in the images and the camera motion solver engine 402 may then request the camera motion analysis tool to provide a second set of positions of the tracking object on the same edge in the images. The camera motion analysis tool may then obtain the second set of positions by placing the tracking object arbitrarily again on the edge in each of the images where the edge appears. After receiving the second set of positions, the camera motion solver engine 402 may be configured to estimate camera motion based on the second set of position and obtain a second camera motion. In some implementations, the output camera motion Mx may be obtained by camera motion solver engine 402 by combining the first, second and any other camera motion estimated in different iterations.

Referring back to FIG. 3, it should be noted that intuitively, a single tracking object on an edge identified in one or more images for a scene works well when the camera engages in a motion in a contradictory to the marker. However, in many cases, the camera, such as camera 116 may not simply move in just one direction when shooting scene 104. A typical situation is that camera 116 moves in more than one direction when shooting scene 104. For example, the camera 116 may pan from left to right while tilting slightly when shooting scene 104. In such a situation, a single tracking object arbitrarily placed on an edge in the images may not be adequate for solving a camera motion in a three-dimensional space. In some embodiments, more than one marker, for example two tracking objects can be arbitrarily placed on an edge identified in the images. In those embodiments, tracking objects arbitrarily placed on the edge can represent the edge, (although not necessarily the entire of the edge as appearing in the images since they are placed on the edge at arbitrarily positions) can be used to solve camera motion by feeding the positions of the tracking objects to the camera motion solver engine 402 shown in FIG. 4.

In some embodiments, instead of placing a single tracking object on an identified edge for solving the camera motion as shown in FIG. 3, two or more tracking objects may be arbitrarily placed along the identified edge in an image. That is, those tracking objects can be placed on the edge such that they can slide along the edge arbitrarily from image to image where the edge appears. The tracking objects can then be connected to represent a line alone the identified edge in the image. The lines can then be used as references for solving camera motion. This works particularly well when the camera motion is "contradictory" to the lines. For example, as camera 116 engages in a panning motion from left to right when shooting scene 104, the positions of a line representing an edge, e.g., edge 302, in those images can be used to establish correspondence between the images. Camera motion for those images can be estimated because edge 302 remains stationary during the shooting of these images.

In some situations, as shown in FIG. 3, an edge may only appear in several frames in the image series captured for the scene. For example, edge 302 only appears in image 202a and 202b in the example shown in FIG. 3. That is, edge 302 can work well for estimating camera motion until time t3 when edge 302 is last captured in the images. Since edge 302 does not appear in images 202c-e, it cannot be used for solving the camera motion when those images are shot. For addressing such a situation, other edges can be identified and tracking objects can be placed on those edges for solving camera motion. This is illustrated in FIG. 5.

Figure 5:
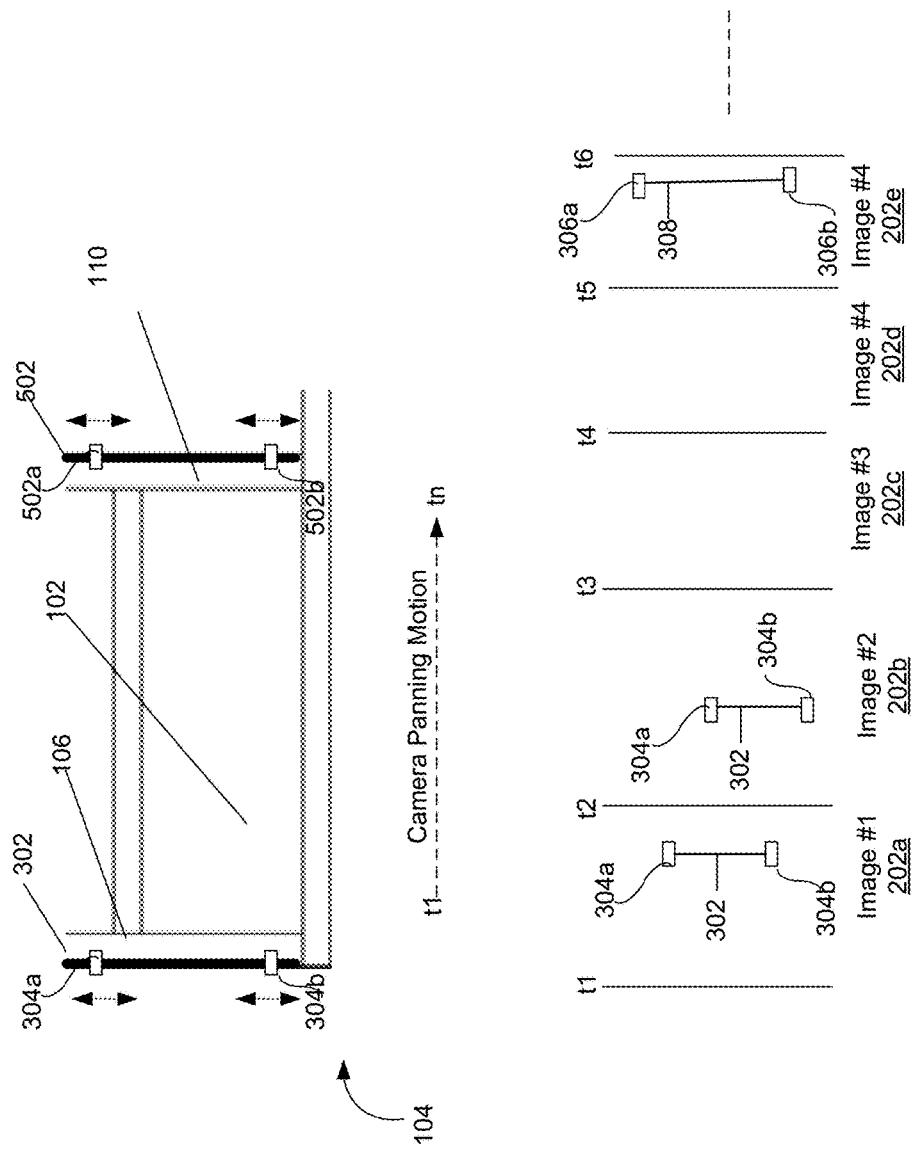
FIG. 5 illustrates another example of placing tracking objects on edges identified in images for a scene for estimating camera motion in accordance with the disclosure.

FIG. 5 illustrates another example of placing tracking objects on edges identified in images for a scene for estimating camera motion in accordance with the disclosure. As shown in this example, tracking objects 304a and 304b can be placed on edge 302 representing side frame 106. As described, tracking object 304a and tracking object 304b can be each placed at a respective arbitrary position on edge 302. In some embodiments, tracking objects 304a and 304b can be placed in a first image, e.g., image 202a, where edge 302 first appears and be instructed to each slide up or down arbitrarily on edge 302 in subsequent images. Similarly, edge 308 representing side frame 110 can be identified in image 202e and subsequent images, and tracking objects 306a and 306b can be likewise placed arbitrarily on edge 308 in those images. The positions of tracking objects 304a, 304b, 306a, and 306b in the images for scene 104 can then be sent to camera motion solver engine 402 shown in FIG. 4 for solving camera motion when the scene 104 is shot by camera 116.

Figure 6:
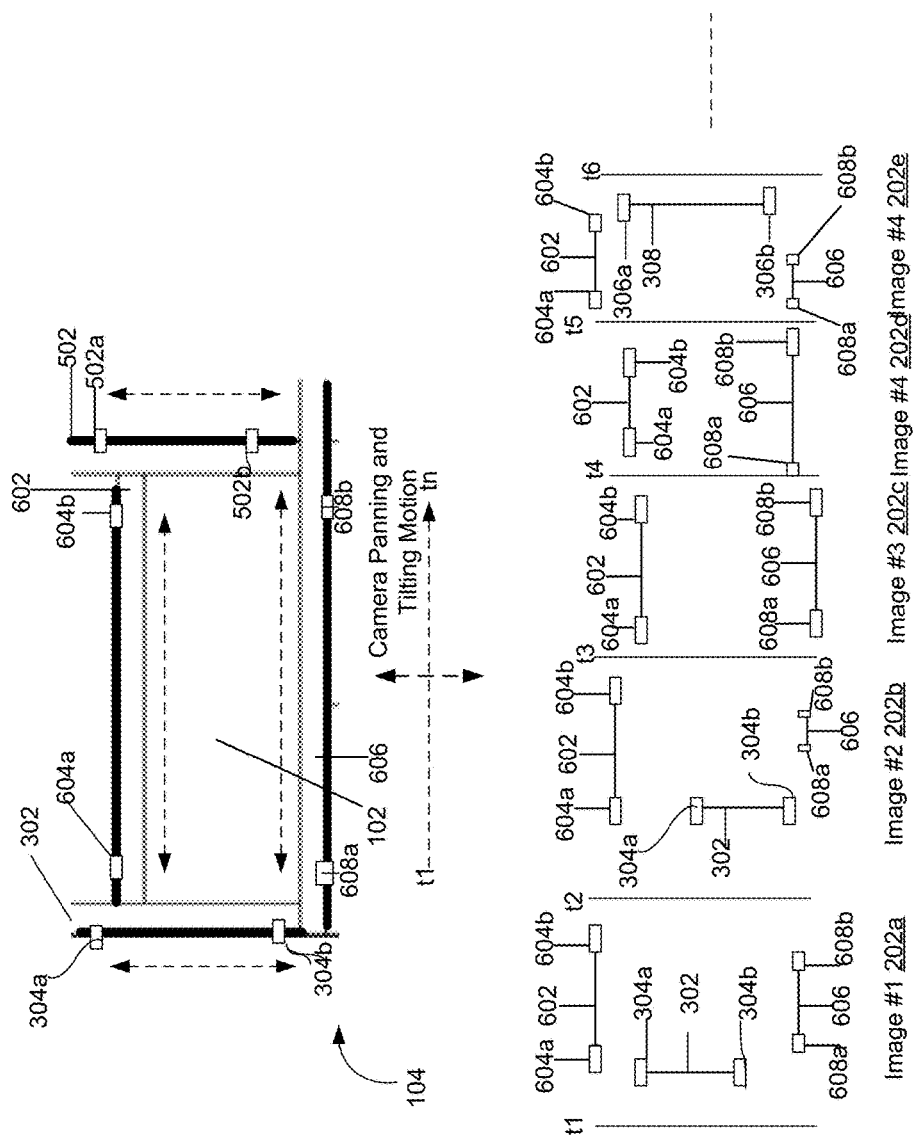
FIG. 6 illustrates still another example of placing tracking objects on edges identified in images for a scene for estimating camera motion in accordance with the disclosure.

FIG. 6 illustrates still another example of placing tracking objects on edges identified in images for a scene for estimating camera motion in accordance with the disclosure. As described above, in many situations, camera, such as camera 116 typically engages in movement in multiple directions when shooting a scene, such as panning and tilting at the same time. In those situations, intuitively identifying one or more edges in one direction or in one substantially similar direction may not be adequate for estimating camera motion in multiple directions. For example, as shown in FIG. 6, if camera 116 engages in panning motion and tilting motion when shooting scene 104, identifying edge 302 and 502 may not be adequate for estimating the tilting camera motion. That is, since both edges 302 and 502 are vertical in scene 104, tracking objects arbitrarily placed on those edges in the images may work well for estimating the panning motion but may not work well for estimating the tilting motion. For addressing such a situation, one or more edges in the images can be further identified. Those edges may be identified such that they are contradictory in direction against some other edges identified in the images. For example, if a set of one or more edges are identified in the images to be in a first direction (e.g., vertical), then a set of one or more edge may be identified in the images such that the second set of edges are contradictory in direction against the first set of edges—e.g., the second set of edges are horizontal.

In FIG. 6, as shown, in addition to the edges 302 and 502 identified in the images 202a-e, edges 602 and 606 can be identified. Those edges may be identified by virtue of being contradictory in direction against edges 302 and 502. As shown, tracking objects can also be arbitrarily placed on edges 602 and 606 in each of the images they appear. In this example, tracking objects 604a and 604b are arbitrarily placed on edge 602 in each of the images 202a-e, tracking objects 606a and 606b are arbitrarily placed on edge 606 in each of the images 202a-e. As shown, the positions of tracking object 602a, 602b, 606a, 606b and as well as tracking objects 304a, 304b, 306a, and 306b can enable estimation a relative position between the camera 116 and media cabinet 102. In implementations, the positions of these tracking objects can be fed into the camera motion solver engine 402 for solving the camera motion. For example, the camera motion solver engine 402 may be configured to estimate the camera motion in the X direction primarily based on positions of tracking objects 304a, 304b, 306a, and 306b, and may estimate the camera motion in the Y direction primarily based on positions of tracking objects 602a, 602b, 606a, 606b in the images 202a-e.

Figure 7:
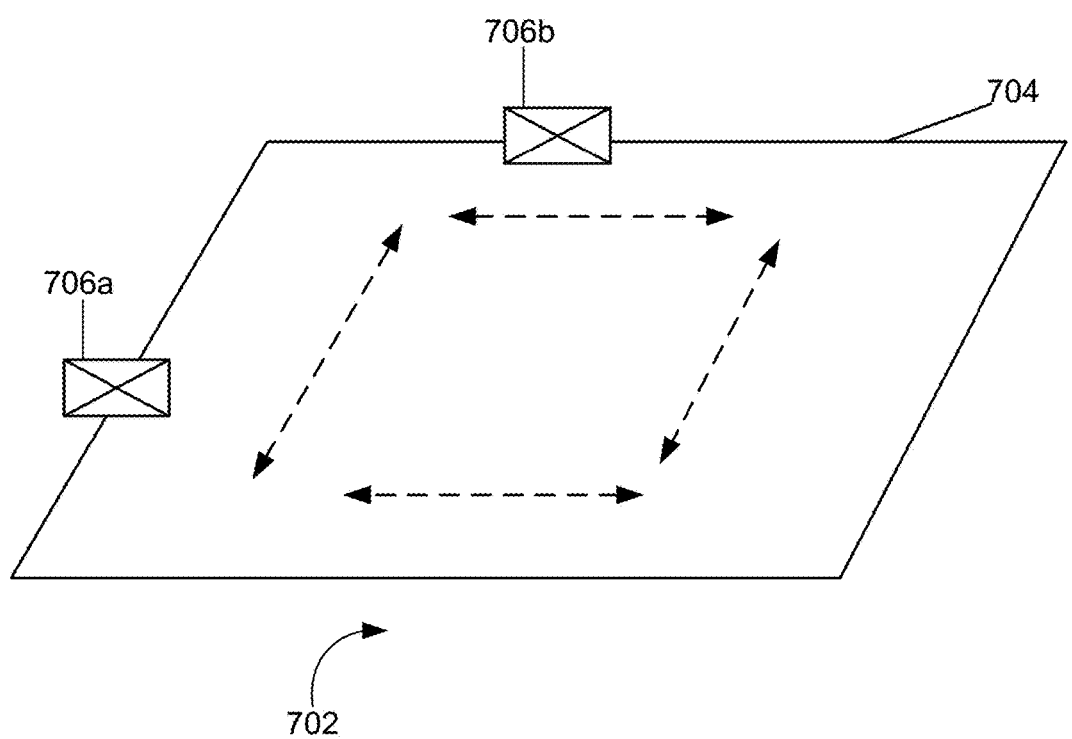
FIG. 7 illustrates the tracking object that can be placed on an edge identified in an image in for solving camera motion in accordance with the disclosure may include a three-dimensional bundle.

In some examples, the tracking object that can be placed on an edge identified in an image for solving camera motion in accordance with the disclosure may include a three-dimensional bundle. FIG. 7 illustrates one example of one or more of a three-dimensional tracking object 706, such as tracking objects 706a and 706b shown in this example. As shown, the tracking objects 706a and 706b can be placed on edges of a 3D panel 704 of an object 702 to mark the edges of the 3D panel 704. The tracking objects 706a can 706b can move along the edges of the 3D panel 704 from image to image arbitrarily. That is, when the 3D tracking object 704a or 704b is placed at an arbitrarily position on an edge of the 3D panel 704 identified in an image, the tracking object 704a or 704b may move arbitrarily along edges of the panel 704 in the subsequent images. In this way, a camera motion in Z direction can be estimated since the tracking objects 704a and 704b not only can provide a reference in X or Y direction, but also can provide a reference in Z direction. This leverages the fact that a static edge in a scene may not move in X, Y and Z directions. In implementations, the positions of the tracking objects 704a and/or 704b (x,y,z) in a given image can be fed into camera motion solver engine 402 for estimating camera motion in a three-dimensional space.

Figure 8:
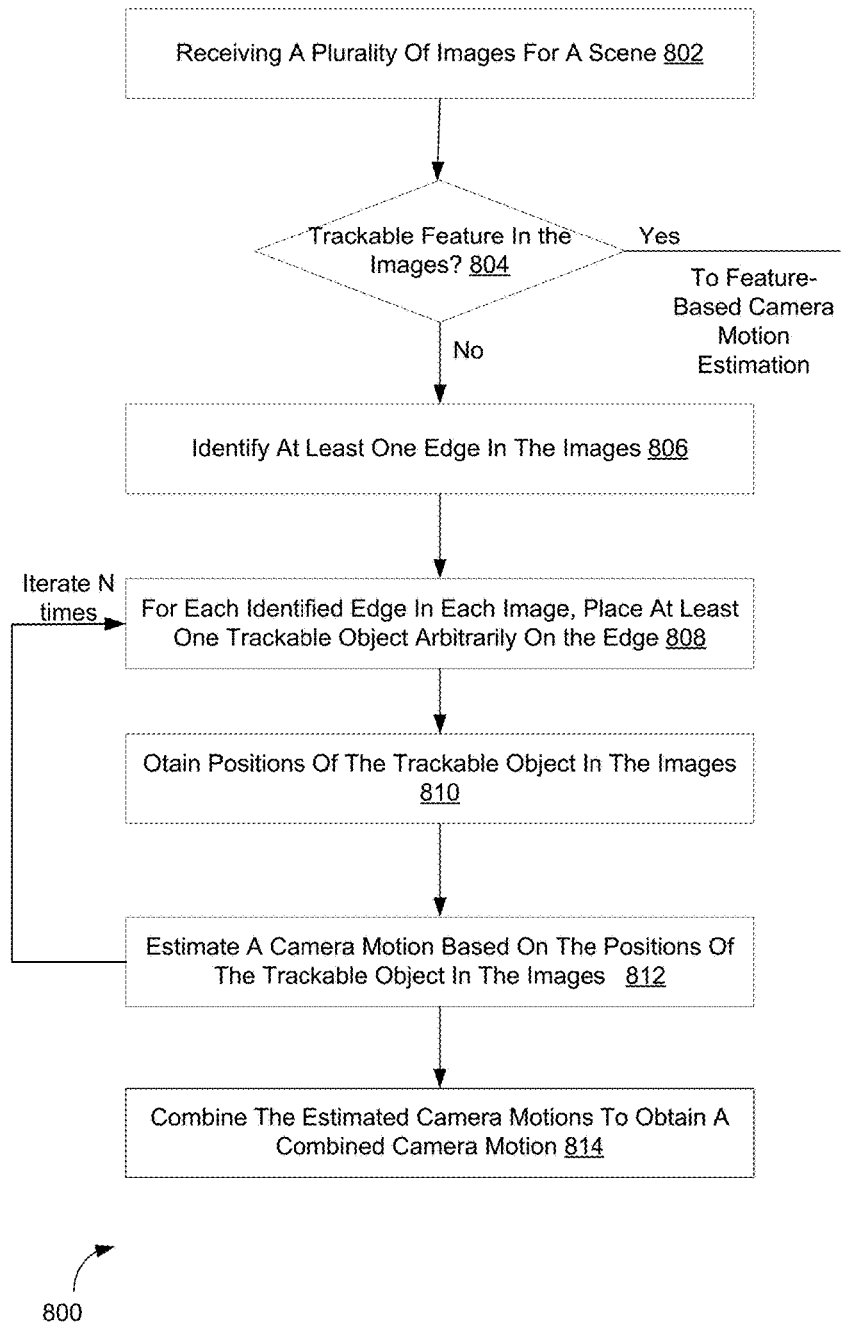
FIG. 8 illustrates an exemplary method for estimating camera motion estimation in accordance with the disclosure.

In some embodiments, the tracking object 704 that can be arbitrarily placed on an identified edge can include a single point bundle. In those embodiments, the single point bundle can animate along a vector or can be constrained to a 3D spline-type curve. Such a three-dimensional tracking object can allow the camera motion solving engine to calculate a correct 3D camera position, without information indicating a direct correspondence between the 2D and 3D spaces in the images Attention is now directed to FIG. 8, where an exemplary method 800 for camera motion estimation in accordance with the disclosure is illustrated. The operations of method 800 presented below are intended to be illustrative. In some embodiments, method 800 may be accomplished with one or more additional operations not described and/or without one or more of the operations discussed. Additionally, the order in which the operations of method 800 are illustrated in FIG. 8 and described below is not intended to be limiting.

In some embodiments, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/ or software to be specifically designed for execution of one or more of the operations of method 800.

At 802, a plurality of images capturing a scene can be received. Examples of such images are illustrated in FIG. 2. In some implementations, images at operation 802 can be received upon a user instruction from a graphical user interface. For example, in one implementation, a user can be enabled to select a scene from a video clip in the graphical user interface and generate a request to obtain the images for the scene through one or more controls provided by the graphical user interface. In that implementation, an image extraction engine can be employed to extract the images for the scene based on the user request. However, this is not necessarily the only case. In some implementations, the images received at operation 802 can be from a 3D space authoring tool configured to reconstruct a 3D space using a scene captured on those images. In some other implementations, the images received at operation 802 may simply be a series of image frames captured by a video camera.

At decision 804, a determination can be made as to whether there are enough trackable features in the images received at 802. As described above, a feature with certain distinctive display attributes, such as a high contrast or distinctive color values, as compared to areas surrounding that feature may be tracked across the images received at operation 802. Such a trackable feature can be used to establish image correspondence. In some embodiments, the decision 804 is automatically made by a computer after the images are received at operation 802. However, this is not necessarily the only case. In some other embodiments, the decision 804 can be made based on a user indication made through a graphical user interface. For example, the graphical user interface can enable the user to indicate there is no trackable feature in the images. It should be understood in implementations, decision 804 can be made by sampling one or more images received at 802. For example, in one implementation, the first image in the images received at 802 can be analyzed for making decision 804. In another example, every image received at operation 802 is analyzed for making decision 804. It should also be understood that in some implementations a threshold may be set such that decision 808 is set to "no" when the number of trackable features identified in the images is less than the threshold. For instance, the threshold may be set to three and if there are less than 3 features that can be identified in one or more of the images received at 802, decision 808 may be set to no. In any case, when decision 808 is set to yes, method 800 can proceed to a conventional feature-based camera motion estimation routine, where the trackable features can be used to estimate camera motion for the images received at 802. When decision 808 is set to no, method can proceed to operation 806.

At operation 808, one or more edges can be identified in the images received at 802. As described above, for each image received at 802, operation 808 may involve an edge detection operation. In certain implementations, the edge detection operation involved in operation 808 can be performed automatically by a computer. However, this is not necessarily the only case. In some other implementations, a user can be enabled to specify one or more edges for the images.

As illustration, in one implementation, the user can be provided a graphical user interface. Through the graphical user interface, the user may mark one or more edges by placing one or more tracking objects in a first image received at operation 802 to be tracked. In that implementation, based on the edge marking(s) by the user in the first image, the computer may be configured to mark along those edges in subsequent images received at 802. As another illustration, in another implementation, the one or more edges may be identified by the computer automatically. For example, the computer may be configured to extract relevant image information from the images received at 802, and for each image to determine one or more edges based on the extracted image information. In that example, the computer can then be configured to identify one or more edges existing in at least two consecutive images to place marker along those edges. Other methods of edge detection involved in operation 808 are contemplated. It should be understood that the edge that can be marked for solving camera motion in accordance with the disclosure can be an outer, inner side of an edge (for example, see 302 in FIG. 3) in some examples, or any identifiable side in the image of any thickness so long as the tracking object is placed on the edge covering the full width of the edge. It should also be understood that in some other examples, the edge that can be marked may not necessarily be straight. For example, a circular edge like a corner of the media cabinet 102 may be used as such an edge in some examples. As another example, a non-linear edge like the top of lampshade may be marked for solving camera motion in accordance with the disclosure in some examples.

As described above, in some embodiments, the edge identification at 806 may involve identifying a first set of one or more edges and a second set of one or more edges such that every edge in the first set is contradictory in direction against every edge in the second set. For example, the first set of edges may comprise edges that are vertical or substantially vertically in the images, and the second set of edges may comprise edges that are horizontal or substantially horizontal in the images.

At 808, for each edge identified in each image received at 802, at least one tracking object can be placed arbitrarily along the edge. In certain implementations, the number of tracking objects to be so placed on the edge can be specified by a user through a graphical user interface. For certain images, one tracking object on the edge may be sufficient for solving the camera motion. For instance, as illustrated in FIG. 3, when the camera motion is "contradictory" against the edge, one tracking object can be sufficient to serve as a reference point. However, in other situations when the camera motion moves or rotates in more than one direction when shooting the scene, one tracking object may not be sufficient. In some embodiments, the user may thus be enabled to place multiple tracking objects arbitrarily on each edge identified in 806 such that may each individually and independently sild arbitrarily on the edge from image to image where the edge appears. As described above, in some implementations, the tracking object placed on the edge at 808 may include a 3D tracking object illustrated in FIG. 7. The 3D tracking object may be configured as shown in FIG. 7 to estimate camera motion in a Z direction.

At 810, positions of the tracking objects placed on the edge(s) in operation 808 can be obtained. In some implementations, operation 810 may involve determining pixel index values where the tracking object appear in the images and determining the tracking object position based on the extract pixel index values.

At 812, a camera motion can be estimated based on the positions of the trackable image as obtained at 810. In some implementations, the camera motion estimated at 812 may involve a single direction at a time, such as camera motion along the X direction in the 3D space in which the camera was operating. As shown, operations 808, 810, and 812 may be repeated N times. For example, in a first iteration, the camera motion in X direction is estimated, in a second iteration, the camera motion in Y direction is estimated, and in a third iteration, the camera motion in Z direction is estimated. In some implementations, the estimation of the camera motion in each iteration may be based on the camera motion estimated in previous iteration or iterations. For example, for estimating the camera motion in Z direction, the estimated camera motion in X and Y directions can be used.

In some examples, the camera estimation motion estimation in each iteration may involve camera motion in all directions in the 3D space where the camera was operating. In those implementations, a current iteration may take the camera motion estimated on a previous iteration or previous iteration as an input for improving or adjusting the camera motion previously estimated. It should be understood the number of iterations for repeating 808, 810 and 812 may not necessarily fixed to a predetermined number, and it can be changed as desired by a user or a computer in accordance with a situation in which the camera is operating.

In some implementations, a user may be enabled to control the aforementioned camera motion estimation process by specifying additional edges to be tracked after certain iteration(s). For example, in those embodiments, the user can be enabled to preview a result of a 3D scene reconstructed based on the estimated camera motion after a first iteration and determine that the 3D scene is not accurate as compared to the scene in the images. In those embodiments, the user can then be enabled to specify one or more additional edges in the images to be tracked in another iteration of the aforementioned camera motion estimation process.

At 814, the camera motions estimated at 812 can be combined to obtain a combined camera motion. For example, the X, Y, Z camera motions estimated at 812 in different iterations can be combined at 814 to obtain a combined camera motion indicating the camera movement in the 3D space when the images received at 802 are shot by the camera. However, this is not necessarily the only case. In some embodiments, camera motions estimated 812 may include camera motions estimated from different sets of tracking objects arbitrarily placed on one or more edges in the images. For example, a first camera motion can be estimated from a first set tracking object placed at first arbitrarily positions on first set of edges in the images, a second camera motion can be estimated from a second set tracking object placed at second arbitrarily positions on second set of edges in the images, and so on. Such camera motions can be combined to obtain a combined camera motion by averaging those camera motions.

Figure 9:
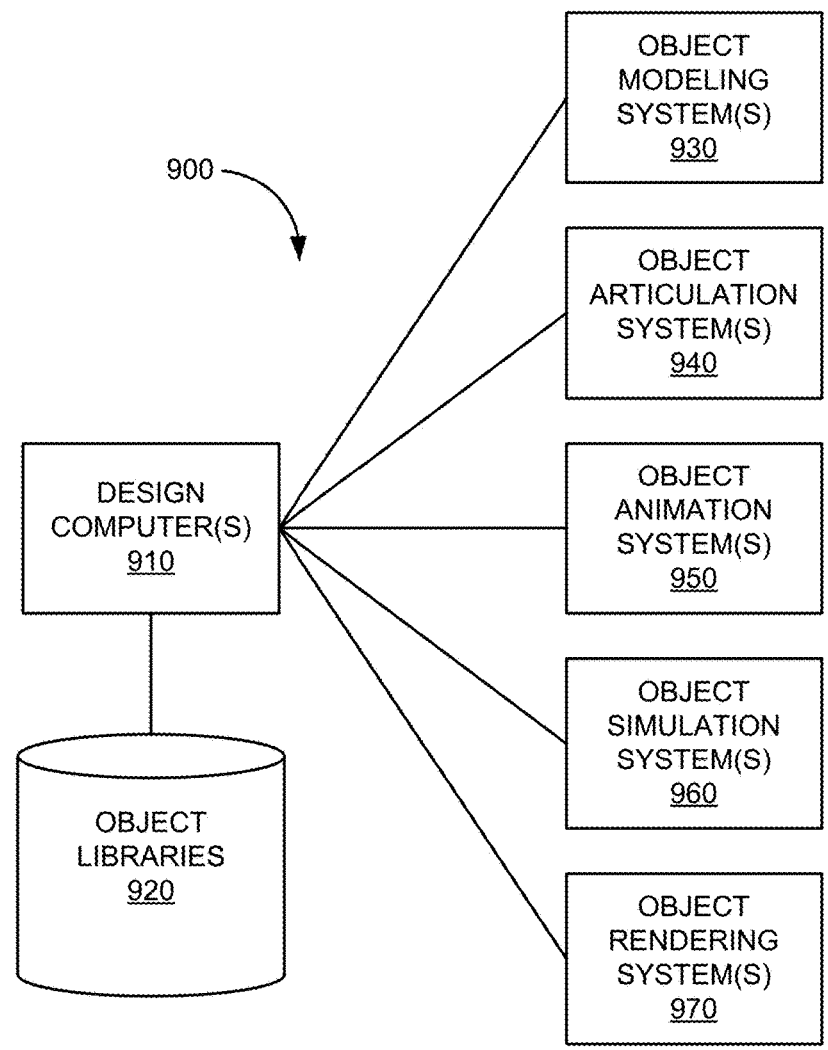
FIG. 9 is a simplified block diagram of system for creating computer graphics imagery (CGI) and computer-aided animation that may implement or incorporate various embodiments

FIG. 9 is a simplified block diagram of system 900 for creating computer graphics imagery (CGI) and computer-aided animation that may implement or incorporate various embodiments. In this example, system 900 can include one or more design computers 910, object library 920, one or more object modeler systems 930, one or more object articulation systems 940, one or more object animation systems 950, one or more object simulation systems 960, and one or more object rendering systems 980. Any of the systems 930-980 may be invoked by or used directly by a user of the one or more design computers 910 and/or automatically invoked by or used by one or more processes associated with the one or more design computers 910. Any of the elements of system 900 can include hardware and/or software elements configured for specific functions.

The one or more design computers 910 can include hardware and software elements configured for designing CGI and assisting with computer-aided animation. Each of the one or more design computers 910 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 910 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 910 acting as a modeler may employ one or more systems or tools to design, create, or modify objects within a computer-generated scene. The modeler may use modeling software to sculpt and refine a 3D model to fit predefined aesthetic needs of one or more character designers. The modeler may design and maintain a modeling topology conducive to a storyboarded range of deformations. In another example, a user of the one or more design computers 910 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 910 acting as an animator may employ one or more systems or tools to specify motion and position of one or more objects over time to produce an animation.

Object library 920 can include elements configured for storing and accessing information related to objects used by the one or more design computers 910 during the various stages of a production process to produce CGI and animation. Some examples of object library 920 can include a file, a database, or other storage devices and mechanisms. Object library 920 may be locally accessible to the one or more design computers 910 or hosted by one or more external computer systems.

Some examples of information stored in object library 920 can include an object itself, metadata, object geometry, object topology, rigging, control data, animation data, animation cues, simulation data, texture data, lighting data, shader code, or the like. An object stored in object library 920 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 930 can include hardware and/or software elements configured for modeling one or more objects. Modeling can include the creating, sculpting, and editing of an object. In various embodiments, the one or more object modeling systems 930 may be configured to generated a model to include a description of the shape of an object. The one or more object modeling systems 930 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 930 may further generate model data (e.g., 2D and 3D model data) for use by other elements of system 900 or that can be stored in object library 920. The one or more object modeling systems 930 may be configured to allow a user to associate additional information, metadata, color, lighting, rigging, controls, or the like, with all or a portion of the generated model data.

The one or more object articulation systems 940 can include hardware and/or software elements configured to articulating one or more computer-generated objects. Articulation can include the building or creation of rigs, the rigging of an object, and the editing of rigging. In various embodiments, the one or more articulation systems 940 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 940 may further generate articulation data (e.g., data associated with controls or animations variables) for use by other elements of system 900 or that can be stored in object library 920. The one or more object articulation systems 940 may be configured to allow a user to associate additional information, metadata, color, lighting, rigging, controls, or the like, with all or a portion of the generated articulation data.

The one or more object animation systems 950 can include hardware and/or software elements configured for animating one or more computer-generated objects. Animation can include the specification of motion and position of an object over time. The one or more object animation systems 950 may be invoked by or used directly by a user of the one or more design computers 910 and/or automatically invoked by or used by one or more processes associated with the one or more design computers 910.

In various embodiments, the one or more animation systems 950 may be configured to enable users to manipulate controls or animation variables or utilized character rigging to specify one or more key frames of animation sequence. The one or more animation systems 950 generate intermediary frames based on the one or more key frames. In some embodiments, the one or more animation systems 950 may be configured to enable users to specify animation cues, paths, or the like according to one or more predefined sequences. The one or more animation systems 950 generate frames of the animation based on the animation cues or paths. In further embodiments, the one or more animation systems 950 may be configured to enable users to define animations using one or more animation languages, morphs, deformations, or the like.

The one or more object animations systems 950 may further generate animation data (e.g., inputs associated with controls or animations variables) for use by other elements of system 900 or that can be stored in object library 920. The one or more object animations systems 950 may be configured to allow a user to associate additional information, metadata, color, lighting, rigging, controls, or the like, with all or a portion of the generated animation data.

The one or more object simulation systems 960 can include hardware and/or software elements configured for simulating one or more computer-generated objects. Simulation can include determining motion and position of an object over time in response to one or more simulated forces or conditions. The one or more object simulation systems 960 may be invoked by or used directly by a user of the one or more design computers 910 and/or automatically invoked by or used by one or more processes associated with the one or more design computers 910.

In various embodiments, the one or more object simulation systems 960 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 960 may be used to simulate the behavior of objects, such as hair, fur, and cloth, in response to a physics model and/or animation of one or more characters and objects within a computer-generated scene.

The one or more object simulation systems 960 may further generate simulation data (e.g., motion and position of an object over time) for use by other elements of system 100 or that can be stored in object library 920. The generated simulation data may be combined with or used in addition to animation data generated by the one or more object animation systems 950. The one or more object simulation systems 960 may be configured to allow a user to associate additional information, metadata, color, lighting, rigging, controls, or the like, with all or a portion of the generated simulation data.

The one or more object rendering systems 980 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 980 may be invoked by or used directly by a user of the one or more design computers 910 and/or automatically invoked by or used by one or more processes associated with the one or more design computers 910. One example of a software program embodied as the one or more object rendering systems 980 can include PhotoRealistic RenderMan, or PRMan, produced by Pixar Animations Studios of Emeryville, Calif.

In various embodiments, the one or more object rendering systems 980 can be configured to render one or more objects to produce one or more computer-generated images or a set of images over time that provide an animation. The one or more object rendering systems 980 may generate digital images or raster graphics images.

In various embodiments, a rendered image can be understood in terms of a number of visible features. Some examples of visible features that may be considered by the one or more object rendering systems 980 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlight rays on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 980 may further render images (e.g., motion and position of an object over time) for use by other elements of system 900 or that can be stored in object library 920. The one or more object rendering systems 980 may be configured to allow a user to associate additional information or metadata with all or a portion of the rendered image.

Figure 10:
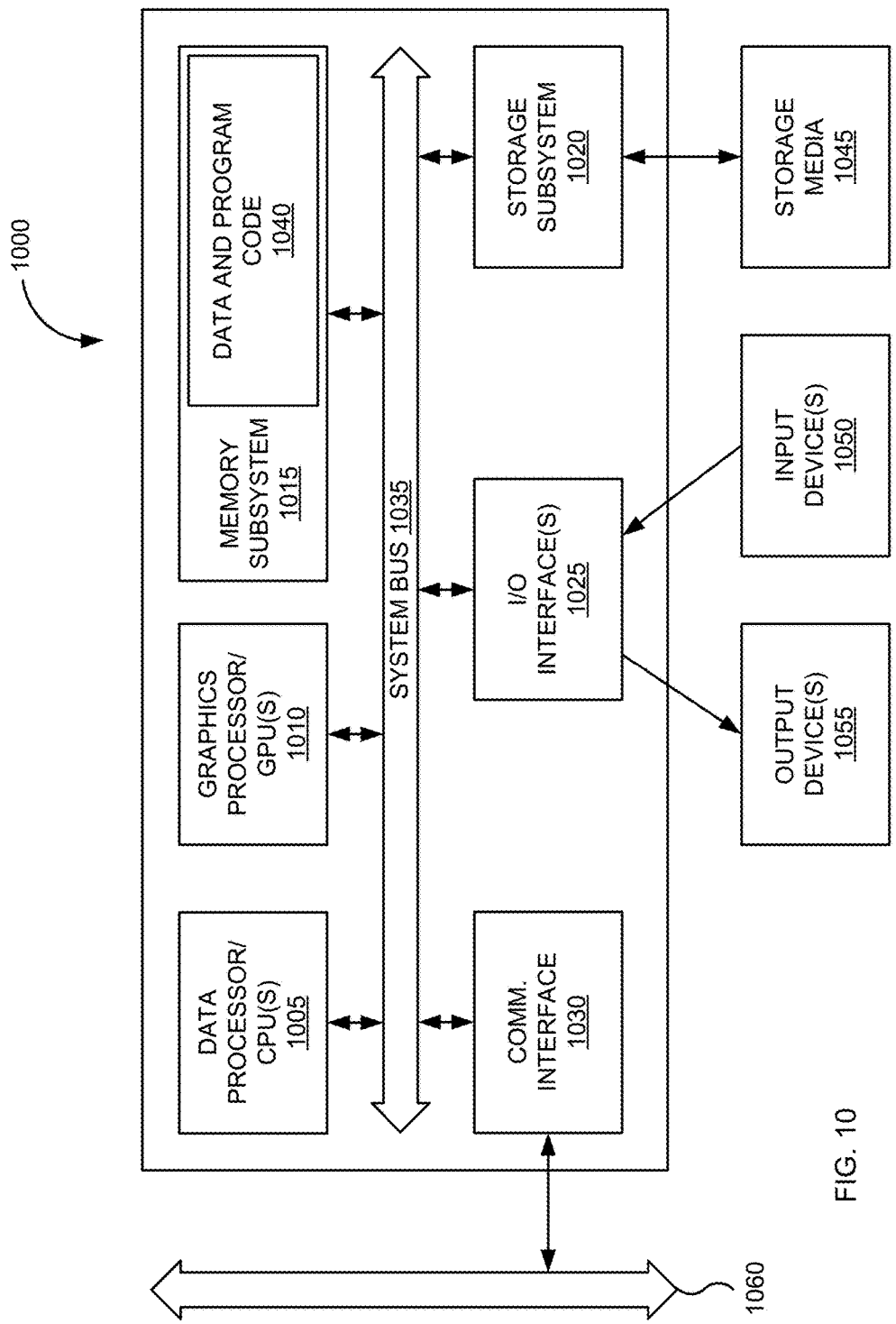
FIG. 10 is a block diagram of a computer system or information processing device that may incorporate an embodiment, be incorporated into an embodiment, or be used to practice any of the innovations, embodiments, and/or examples found within this disclosure.

FIG. 10 is a block diagram of computer system 1000. FIG. 10 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1000 and any of its components or subsystems can include hardware and/or software elements configured for performing methods described herein.

Computer system 1000 may include familiar computer components, such as one or more one or more data processors or central processing units (CPUs) 1005, one or more graphics processors or graphical processing units (GPUs)

1010, memory subsystem 1015, storage subsystem 1020, one or more input/output (I/O) interfaces 1025, communications interface 1030, or the like. Computer system 1000 can include system bus 1035 interconnecting the above components and providing functionality, such connectivity and inter-device communication.

The one or more data processors or central processing units (CPUs) 1005 can execute logic or program code or for providing application-specific functionality. Some examples of CPU(s) 1005 can include one or more microprocessors (e.g., single core and multi-core) or micro-controllers, one or more field-gate programmable arrays (FPGAs), and application-specific integrated circuits (ASICs). As used herein, a processor includes a multi-core processor on a same integrated chip, or multiple processing units on a single circuit board or networked.

The one or more graphics processor or graphical processing units (GPUs) 1010 can execute logic or program code associated with graphics or for providing graphics-specific functionality. GPUs 1010 may include any conventional graphics processing unit, such as those provided by conventional video cards. In various embodiments, GPUs 1010 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1010 may include any number of registers, logic units, arithmetic units, caches, memory interfaces, or the like.

Memory subsystem 1015 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1015 can include data and program code 1040.

Storage subsystem 1020 can also store information using machine-readable articles, information storage devices, or computer-readable storage media. Storage subsystem 1020 may store information using storage media 1045. Some examples of storage media 1045 used by storage subsystem 1020 can include floppy disks, hard disks, optical storage media such as CD-ROMS, DVDs and bar codes, removable storage devices, networked storage devices, or the like. In some embodiments, all or part of data and program code 1040 may be stored using storage subsystem 1020.

The one or more input/output (I/O) interfaces 1025 can perform I/O operations. One or more input devices 1050 and/or one or more output devices 1055 may be communicatively coupled to the one or more I/O interfaces 1025. The one or more input devices 1050 can receive information from one or more sources for computer system 1000. Some examples of the one or more input devices 1050 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1050 may allow a user of computer system 1000 to interact with one or more non-graphical or graphical user interfaces to enter a comment, select objects, icons, text, user interface widgets, or other user interface elements that appear on a monitor/display device via a command, a click of a button, or the like.

The one or more output devices 1055 can output information to one or more destinations for computer system 1000. Some examples of the one or more output devices 1055 can include a printer, a fax, a feedback device for a mouse or joystick, external storage systems, a monitor or other display device, a communications interface appropriately configured as a transceiver, or the like. The one or more output devices 1055 may allow a user of computer system 1000 to view objects, icons, text, user interface widgets, or other user interface elements. A display device or monitor may be used with computer system 1000 and can include hardware and/or software elements configured for displaying information.

Communications interface 1030 can perform communications operations, including sending and receiving data. Some examples of communications interface 1030 may include a network communications interface (e.g. Ethernet, Wi-Fi, etc.). For example, communications interface 1030 may be coupled to communications network/external bus 1060, such as a computer network, a USB hub, or the like. A computer system can include a plurality of the same components or subsystems, e.g., connected together by communications interface 1030 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1000 may also include one or more applications (e.g., software components or functions) to be executed by a processor to execute, perform, or otherwise implement techniques disclosed herein. These applications may be embodied as data and program code 1040. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1015 and/or storage subsystem 1020.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method of for estimating camera motion, the method being performed by a computer and comprising:
   receiving a plurality of images for a scene, the image including a first image;
   determining there is not at least one trackable feature in the images;
   in response to the determination that there is not at least one trackable feature in the images, identifying a first edge in the first image;
   for each image of the images, placing a first tracking object arbitrarily on the first edge;
   obtaining positions of the first tracking object in the images; and
   estimating a first camera motion based on the positions of the first tracking object in the images, wherein the first camera motion include at least two of the following motions: panning, tilting, rolling, moving horizontal, moving vertically, moving back and forth, or moving diagonally.

2. The method of claim 1, further comprising
   for each of the images, placing a second tracking object arbitrarily on the first edge;
   obtaining positions of the second tracking object in the images; and, wherein
   the first camera motion is estimated further based on positions of the second tracking object.

3. The method of claim 1, wherein the first edge is a substantially vertical or substantially horizontal.

4. The method of claim 1, further comprising
   identifying a second edge in the images;
   for each of the images, placing a third tracking object arbitrarily on the second edge;
   obtaining positions of the third tracking object in the images; and
   estimating a second camera motion based on the positions of the third tracking object.

5. The method of claim 4, further comprising combining the first and second camera motion to obtain a combined camera motion.

6. The method of claim 4, wherein the first edge is substantially vertical and the second edge is substantially horizontal.

7. The method of claim 4, wherein the first edge and second edge are contradictory in direction.

8. The method of claim 1, wherein the first camera motion and the first edge are contradictory in direction.

9. The method of claim 1, wherein the first camera motion includes at least one of a panning and a tilt motion.

10. The method of claim 1, wherein tracking object placed on the first edge includes a point bundle that animates along the first edge.

11. A system of for estimating camera motion, the system comprising one or more processors configured to execute machine-readable instructions such that when the machine-readable instructions are executed, the one or more processors are caused to perform:
    receiving a plurality of images for a scene, the image including a first image;
    determining there is not at least one trackable feature in the images;
    in response to the determination that there is not at least one trackable feature in the images, identifying a first edge in the first image;
    for each image of the images, placing a first tracking object arbitrarily on the first edge;
    obtaining positions of the first tracking object in the images; and
    estimating a first camera motion based on the positions of the first tracking object in the images, wherein the first camera motion include at least two of the following motions: panning, tilting, rolling, moving horizontal, moving vertically, moving back and forth, or moving diagonally.

12. The system of claim 11, wherein the one or more processors are further caused to perform:
    for each of the images, placing a second tracking object arbitrarily on the first edge;
    obtaining positions of the second tracking object in the images; and, wherein
    the first camera motion is estimated further based on positions of the second tracking object.

13. The system of claim 11, wherein the first edge is a substantially vertical or substantially horizontal.

14. The system of claim 11, wherein the one or more processors are further caused to perform:
    identifying a second edge in the images;
    for each of the images, placing a third tracking object arbitrarily on the second edge;
    obtaining positions of the third tracking object in the images; and
    estimating a second camera motion based on the positions of the third tracking object.

15. The system of claim 14, wherein the one or more processors are further caused to perform combining the first and second camera motion to obtain a combined camera motion.

16. The system of claim 14, wherein the first edge is substantially vertical and the second edge is substantially horizontal.

17. The system of claim 14, wherein the first edge and second edge are contradictory in direction.

18. The system of claim 11, wherein the first camera motion and the first edge are contradictory in direction.

19. The system of claim 11, wherein the first camera motion includes at least one of a panning and a tilt motion.

20. The system of claim 11, wherein tracking object placed on the first edge includes a point bundle that animates along the first edge.

* * * * *